D. B. GOEWEY.
FIRE-KINDLER.
No. 177,709. Patented May 23, 1876.
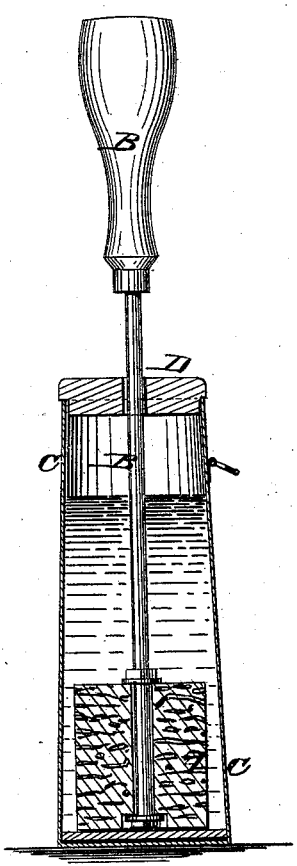
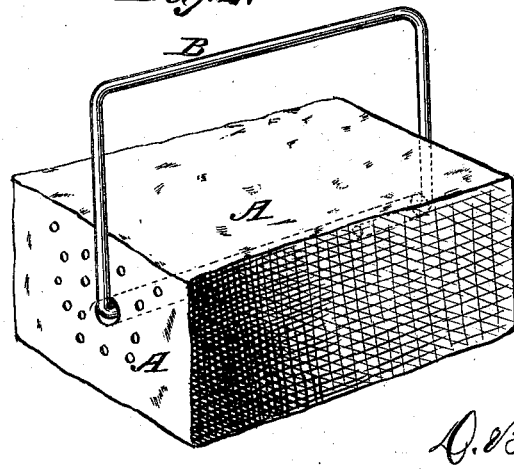
WITNESSES:
Francis McArdle.
John Goethals
INVENTOR:
D. B. Goewey
BY
[signature]
ATTORNEYS.

UNITED STATES PATENT OFFICE.

DAVID B. GOEWEY, OF LYONS, NEW YORK.

IMPROVEMENT IN FIRE-KINDLERS.

Specification forming part of Letters Patent No. 177,709, dated May 23, 1876; application filed January 29, 1876.

*To all whom it may concern:*

Be it known that I, DAVID B. GOEWEY, of Lyons, in the county of Wayne and State of New York, have invented a new and useful Improvement in Fire Torch or Kindler, of which the following is a specification:

Figure 1 is a longitudinal section of my improved fire-kindler and its oil-cup. Fig. 2 is a perspective view of another form of the kindler.

Similar letters of reference indicate corresponding parts.

The object of this invention is to furnish an improved device for kindling wood and coal fires with kerosene-oil or other liquid fuel, or for enabling said liquid to be used as fuel.

The invention consists in the fire-kindler formed of fire-clay, fire-sand, and sawdust or wheat-bran, wet with water, molded into any desired form, and baked or burned to adapt it to be used for burning liquid fuel, as hereinafter fully described.

A represents the fire-kindler, which is prepared of fire-clay, fire-sand, and sawdust or wheat-bran, in the hereinafter-described manner. One part of fire-clay, two parts of fire-sand, and a small quantity of sawdust or wheat-bran are mixed together, and enough water is added to form a mortar that can be molded into any desired form.

The fire-kindler A may be made in the form of a cylinder, as shown in Fig. 1, or in a square form, as shown in Fig. 2, or in any other desired form, according to the purpose for which it is to be used.

The kindler A is perforated to receive a rod or bail, B, to serve as a handle for handling it. After the kindler has been molded into the desired shape, and perforated, it is baked or burned in a kiln or other suitable place for about forty-eight hours, the fire being at first slow, and afterward raised to a white heat. This burns out the sawdust or bran, and forms a porous fire-proof brick or artificial stone capable of absorbing kerosene-oil or other liquid fuel. The handle or bail B is now inserted in the perforation provided for it, and fastened in any suitable manner, and the kindler is then ready for use.

In using the kindler A, it is dipped into a vessel of kerosene-oil until saturated. It is then set on fire with a match, and is then placed beneath the fuel to be set on fire.

The form shown in Fig. 2 is designed for use in large deep fire-boxes, and is saturated, set on fire, and placed in the bottom of the fire-box, and the wood and coal are placed upon it. After the fire has become fully kindled, the kindler is removed with a long hook.

C represents a case to contain the oil, and into which the kindler is placed to be saturated. The case C should be made of about the same shape as the kindler A, may be provided with a cover, D, and may be used as a receptacle for the kindler A when not in use.

By making the kindler A of suitable shape and size it may be used for burning liquid fuel for heating and cooking purposes, as a torch for thawing out frozen water and steam pipes, and for various other uses, such as linings for filters, where water has to be filtered for use; as a torch in spearing fish at night; as an absorber or inside lining to lamps; as a torch around railroad shops and cars, &c., without any danger or possibility of an explosion.

Fire-sand is an article of commerce generally used for fire-brick and furnace-linings. It is of a brownish color, and will not melt under a high heat.

I am aware that patents have been granted for various compositions for forming fire-kindlers on a principal similar to mine. Such compositions have, however, been objectionable, in that they have not been able to stand the heat to which they have been subjected, without melting or crumbling. My composition, consisting mainly of fire-sand, a perfectly fire-proof material, is able to withstand any degree of heat. It is also to be observed that, in such compositions as have been previously patented for this purpose, the composition has been molded around a bail or handle, and then baked or burned. This is not, and could not be, done with my invention, which is first molded, then perforated to receive a handle, then baked under a white heat, which would melt iron, and then furnished with a handle. It is then completed for use.

Having thus described my invention, I claim as new and desire to secure by Letters Patent—

1. As an article of manufacture, a porous block for fire-kindling purposes, consisting of fire-sand, two-thirds, and fire-clay, one-third, substantially as and for the purposes herein shown and specified.

2. The process herein described of manufacturing fire torches or kindlers, consisting in first mixing fire-sand, fire-clay, sawdust, and water in or about the proportions named; then molding the plastic mass thus formed into any suitable shape; then perforating the block thus formed; then burning or baking it at a white heat; and, lastly, supplying it with a suitably-shaped handle, substantially as and for the purpose herein shown and specified.

DAVID B. GOEWEY.

Witnesses:
AARON REMSEN,
SAMUEL C. REDGRAVE.